(12) United States Patent
Sørensen

(10) Patent No.: US 6,237,331 B1
(45) Date of Patent: May 29, 2001

(54) HYDRAULIC STEERING ARRANGEMENT

(75) Inventor: Ole Vincentz Sørensen, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/433,390

(22) Filed: Nov. 3, 1999

(30) Foreign Application Priority Data

Nov. 9, 1998 (DE) .............................................. 198 51 482

(51) Int. Cl.$^7$ .................................................. B62D 5/093
(52) U.S. Cl. .............................................. 60/384; 60/387
(58) Field of Search ....................... 60/384, 387; 180/441

(56) References Cited

U.S. PATENT DOCUMENTS

| | | | |
|---|---|---|---|
| 5,297,647 | * 3/1994 | Duffy | 180/441 X |
| 5,542,343 | * 8/1996 | Martin | 180/441 X |
| 5,680,805 | * 10/1997 | Langkamp | 180/441 X |

FOREIGN PATENT DOCUMENTS

WO 97/21581 * 6/1997 (WO) ..................................... 60/384

* cited by examiner

*Primary Examiner*—John E. Ryznic
(74) *Attorney, Agent, or Firm*—Lee, Mann, Smith, McWilliams, Sweeney & Ohlson

(57) ABSTRACT

The invention relates to a hydraulic steering arrangement (1) with a housing (4), in which an inner control slide (7) and an outer control slide (6) are arranged to be mutually rotational, forming together a variable flow path device between a supply connection device (P, T) and a working connection device (L,R), at least one pressure chamber (17) being arranged between two working slides (15, 16), connected with both control slides (6, 7), the volume change of said pressure chamber (17) causing the relative displacement, and with a measuring motor (10).

Figure 1:
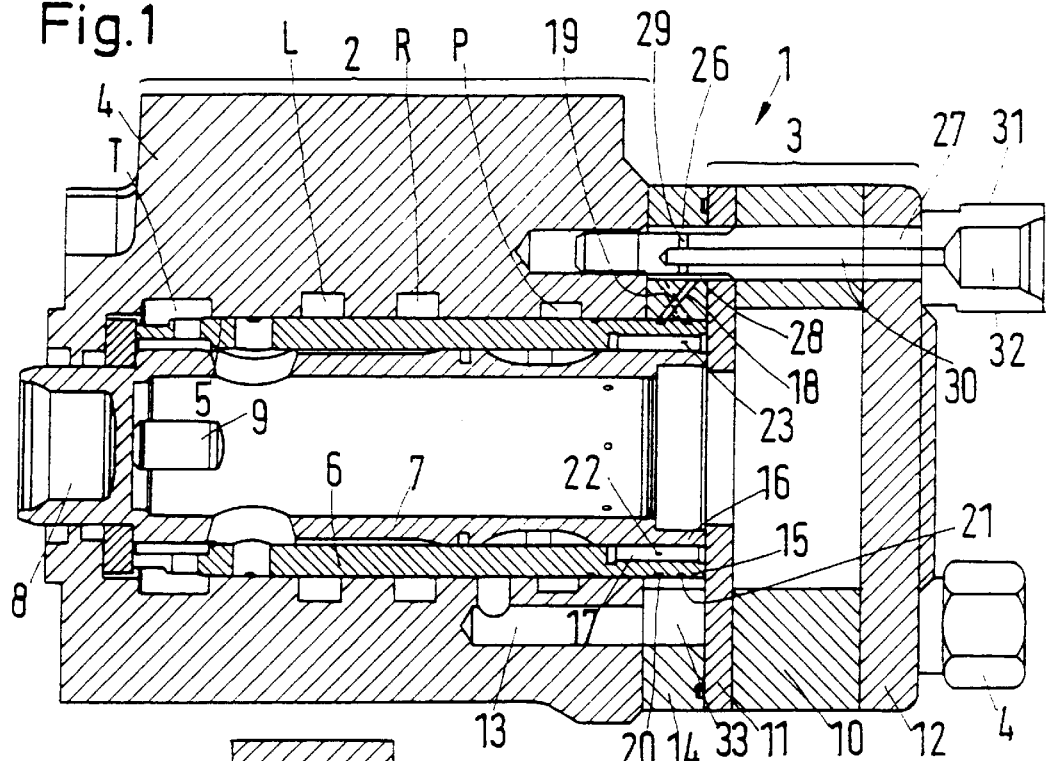

In such steering arrangements a simple an inexpensive way of realizing a remote control principle is desired.

For this purpose, an intermediary plate (14) is arranged between the measuring motor (10) and the control slides (6, 7), in which plate at least one fluid channel (18, 19) is arranged to form at least one part of a connection from the pressure chamber (17) to the outside.

10 Claims, 4 Drawing Sheets

HYDRAULIC STEERING ARRANGEMENT

The invention relates to a hydraulic steering arrangement with a housing, in which an inner control slide and an outer control slide are arranged to be mutually rotational, forming together a variable flow path device between a supply connection device and a working connection device, at least one pressure chamber being arranged between two working slides, connected with both control slides, the volume change of said pressure chamber causing the relative displacement, and with a measuring motor.

A hydraulic steering arrangement of this kind is known from DE 195 46 281 A1.

In such steering arrangements the supply connection device usually comprises a pump connection and a tank connection. The working connection device usually comprises two working connections. Depending on which of the working connections is acted upon by pressure, a connected steering motor is moved in one direction or the other.

The steering arrangement described in the introduction can, on the one hand, be operated by means of a steering handwheel, which is used to rotate the inner control slide in relation to the outer control slide. Thus, a flow path between the pump connection and the corresponding working connection, or between the other working connection and the tank connection, is released under more or less throttling. Thus, hydraulic fluid flows from the pump via the steering motor and back to the tank. At the same time, the hydraulic fluid activates the measuring motor, which rotates the outer control slide in relation to the inner control slide, thus bringing the two control slides back to their initial overlapping, in which the flow path is closed.

On the other hand, the known steering arrangement can also be controlled without a steering handwheel, in that a pressure is applied in the pressure chamber. The pressure leads to a volume expansion, which again causes that the two control slides are moved in relation to each other. The pressure build-up in the pressure chamber can be remote-controlled, so that by means of this arrangement it is also possible to perform a remote control of the steering arrangement.

The invention is based on the task of providing a simple and non-expensive control arrangement, which is based on the remote control principle mentioned above.

In a steering arrangement as described in the introduction, this task is solved in that an intermediary plate is arranged between the measuring motor and the control slides, in which plate at least one fluid channel is arranged to form at least one part of a connection from the pressure chamber to the outside.

With this embodiment it is possible to use the measuring motor and the housing of a steering arrangement, which has until now only been activated by way of a steering handwheel. Also the two control slides can remain substantially unchanged. It is only required either to extend them a little axially to provide them with working slides, to arrange working slides on the control slides, or to connect them in a different way. In other words, a customary steering arrangement can be used, which has proved its performance and in which the dimensioning is appropriate, which steering arrangement can then be remote controlled by means of a volume change induced in a pressure chamber between the two slides. The volume change is induced in that a pressure fluid is either supplied or drawn off through the fluid channel. The corresponding pressure control, that is, the pressure build-up or the pressure reduction can take place on the outside, that is, outside the housing. The remaining parts do not have to be changed, that is, it is not necessary to provide new borings through the known housing or the known measuring motor, to serve as channels for the pressure fluid.

In a preferred embodiment it is provided that the working slides project into the intermediary plate. The only additional component to be provided, is the intermediary plate. This intermediary plate can also be used to provide a space in whose axial extension the pressure chamber can be arranged. Thus, the remaining parts must not be changed. Additionally, the working slide can be acted upon directly via the intermediary plate, without requiring large deflections which cause problems with regard to sealing.

Preferably, the fluid channel ends in an annular chamber, which is formed between the intermediary plate and the outer working slide. Thus, the pressure chamber can also be fed or acted upon from the outside. This provides a very simple way of supply. Axial sealings are only required to a very limited extent. As the annular chamber surrounds the slide on the whole circumference, the supply of the pressure chamber is independent of the rotation position of both working slides.

Preferably, the annular chamber is formed by a groove on the outer circumference of the outer working slide and/or in the inner circumference of the intermediary plate. A groove of this kind at the same time forms a limitation in the axial direction, so that also more than one groove, in particular two grooves, can be provided between the outer slide and the intermediary plate. Such grooves are relatively simple to produce, so that the production costs are limited.

Preferably, two fluid channels are provided, of which each is connected with a group of pressure chambers, the two groups having opposite action directions. In this way the relative displacement between the outer slide and the inner slide can be performed in both directions, meaning that both steering directions can be remote-controlled in the same way. The moment the pressure chambers of one group are acted upon by pressure fluid and expand, the pressure fluid is displaced from the pressure chambers of the other group. This results in two operating opportunities, firstly when building up the pressure and secondly when controlling the outflow of the hydraulic fluid.

Preferably, the connections between the two groups and the outside have substantially the same flow resistance. Thus, the control behaviour in both steering directions is at least approximately the same.

In a preferred embodiment it is provided that the fluid channel ends on the circumference of the intermediary plate. Thus, the fluid channel passes through the intermediary plate from the bore, in which the working slide is arranged, to the outside, that is, substantially radially. An exact radial alignment of the fluid channel is, however, not required. In this embodiment, the fluid channels are exclusively arranged in the intermediary plate. Thus, the working of other parts can be avoided.

In this connection, it is particularly preferred that the intermediary plate, in the area, in which the fluid channel ends outside, has a plane bearing surface. Thus, control elements, for example valves, can be fixed on this bearing surface. The sealing towards connecting parts is simplified when the bearing surface is plane.

In an alternative embodiment it is provided that the fluid channel ends in a bore in the intermediary plate, through which bore a fixing bolt is led, the fixing bolt having a longitudinal bore, which forms an additional part of the connection. In a steering arrangement comprising a control slide part and a measuring motor part, it is necessary to fix the two parts on each other axially, this fixing having to be performed with a certain force to provide the required sealing between these two parts. In known steering arrangements fixing bolts are inserted from an axial side, for example the side of the measuring motor, and then screwed into the control slide part. These fixing bolts can additionally be used to provide a fluid path, which continues the fluid channel and permits a pressure fluid to get from the outside to the inside. Expediently, for this purpose the fixing bolt has an internal bore, as it is easier to fix connecting parts, like for example valves or other lines, to such an internal bore.

In this connection it is advantageous that the fixing bolt, on part of its length, is surrounded by an annular slot, into which at least one radial bore connected with the longitudinal bore and the fluid channel flow. Such a slot reduces the requirements on the mounting accuracy. The radial bore connecting the longitudinal bore with the circumference of the fixing bolt must no longer be brought to exact overlapping with the opening of the fluid channel into the bore. Deviations between the positions are adjusted by the slot, through which the pressure fluid can spread.

In the following the invention is described on the basis of a preferred embodiment in connection with the drawings, showing:

FIG. 1 a first embodiment of a steering arrangement

Figure 1A:
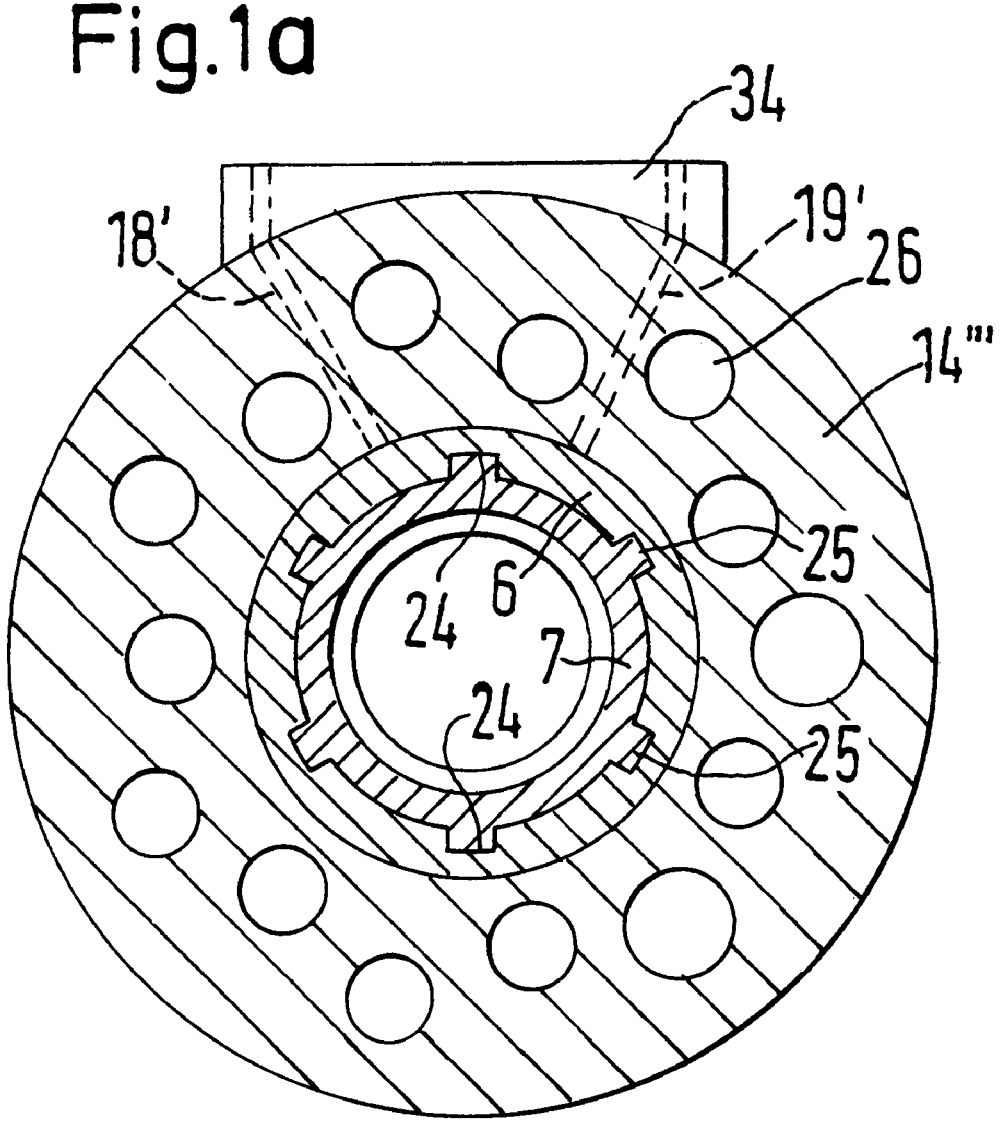

FIG. 1a a cross sectional illustration through the steering arrangement illustrated in FIG. 1 showing the relative rotation between two slides.

Figure 2:
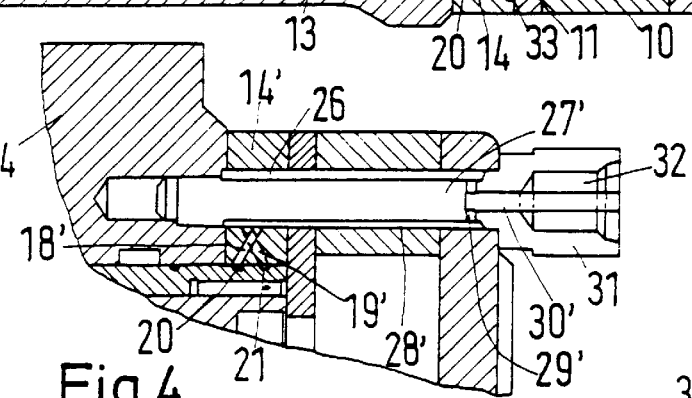
Figure 3:
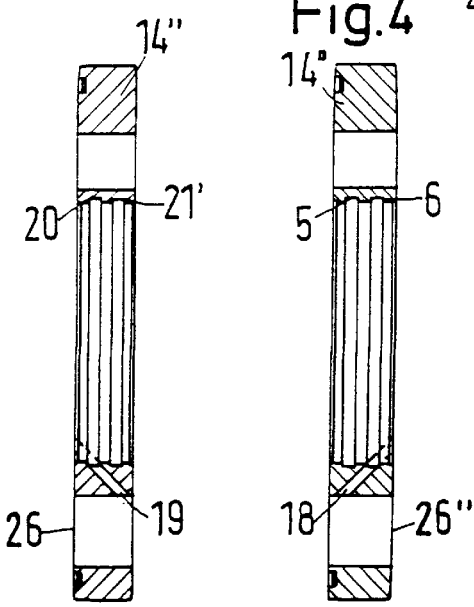
Figure 4:
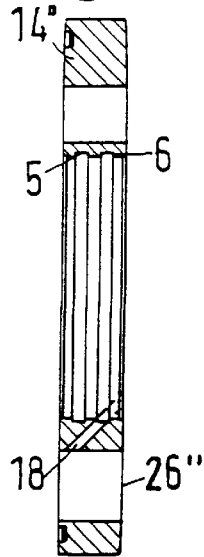
Figure 5:
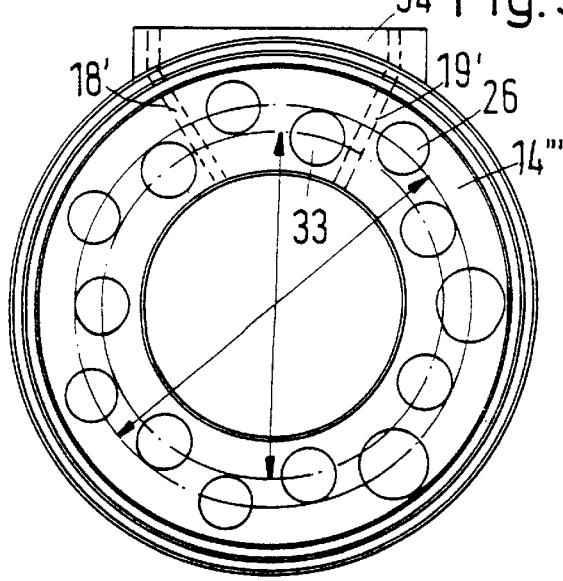
Figure 6:
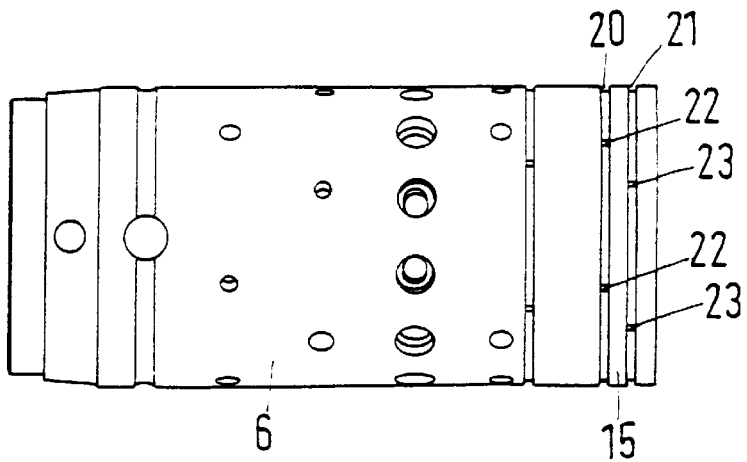
Figure 7:
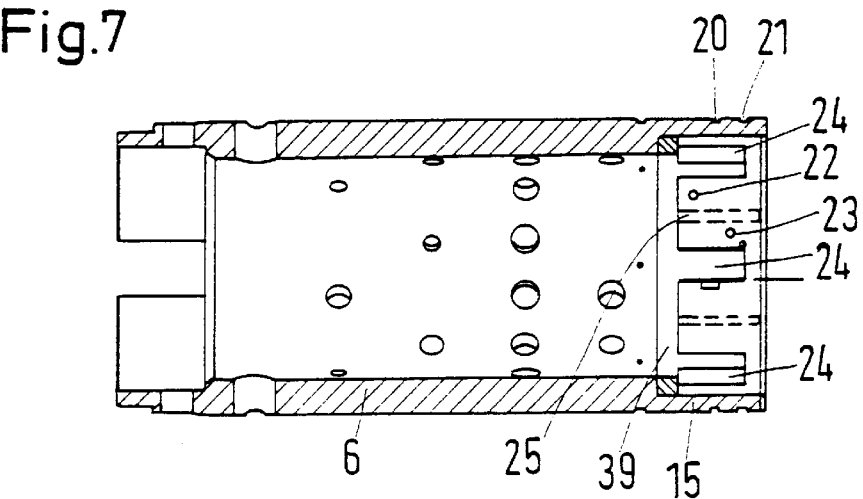
Figure 8:
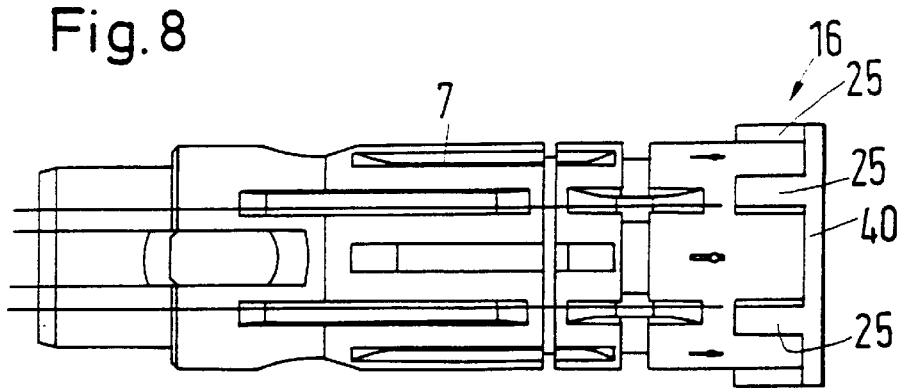
Figure 9:
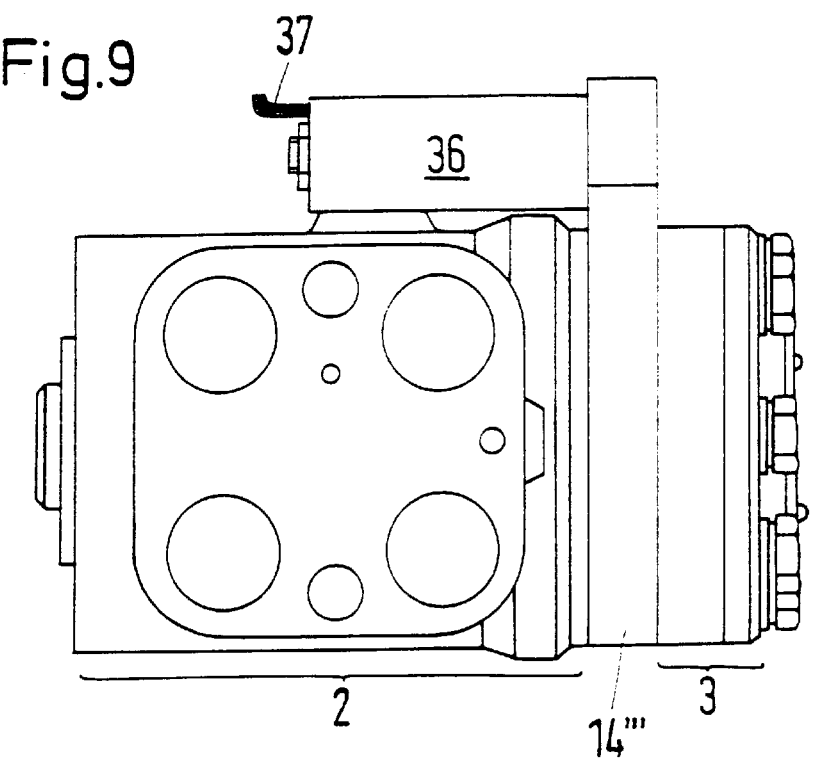

FIG. 2 a detail of a different embodiment with an alternative routing of the hydraulic fluid FIG. 3 a section through an intermediary plate FIG. 4 another section through the intermediary plate FIG. 5 a third embodiment with top view of the intermediary plate FIG. 6 the outer slide seen from the outside FIG. 7 a section through the outer slide FIG. 8 a view of the inner slide FIG. 9 a side view of the embodiment according to FIG. 5

Figure 10:
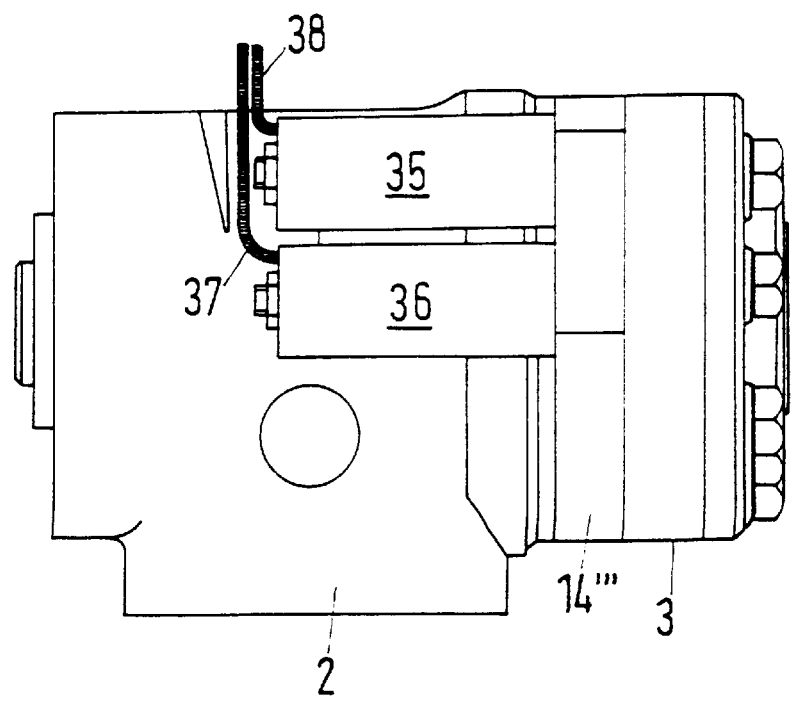

FIG. 10 a top view of the embodiment according to FIG. 9

FIG. 1 shows a hydraulic steering unit 1 with a control section 2 and a measuring motor section 3.

The control section 2 has a housing 4 with an inner bore 5. In the inner bore 5 a hollow outer slide 6 is arranged concentrically, in which an inner slide 7 is also arranged concentrically. On one end (to the left in the drawing) the inner slide 7 has an engagement profile 8, on which a steering shaft, operable by means of a steering handwheel, can be fixed. The inner slide 7 is connected with the outer slide 6 via a spring package 9, for example leaf springs, so that a limited angle displacement possibility is provided between the outer slide 6 and the inner slide 7, the spring package acting upon the slides 6, 7 in a way, that they endeavour resetting to the neutral position.

In the circumferential wall of the inner bore 5, various annular grooves are arranged, which are connected with connections (not shown in detail), which end in the housing 4. These connections are two direction connections L, R, which together form a working connection device. The connections connected with the grooves L, R are connected with corresponding connections of a steering motor.

Axially outside the direction grooves L, R a tank groove T and a pump groove P are arranged, which are connected with a tank connection and a pump connection, which together form a supply connection device.

The mode of operation of such a steering arrangement is known per se. When, by means of the steering handwheel, the inner control slide 7 is turned in relation to the outer control slide 6, a flow path from the pump groove P to one of the working grooves L, R opens in dependence of the direction. Accordingly, another flow path opens from the other working connection R, L to the tank connection T. Thus the two slides 6, 7 in common form a variable flow path arrangement. The bores, grooves and channels in the two slides 6, 7 required for this function are shown schematically, but will not be explained in detail.

At the same time, a corresponding amount of hydraulic fluid is led to a measuring motor 10, which is arranged in the measuring motor section 3 between two cover plates 11, 12. The measuring motor 10 has a gear wheel, known per se and not shown in detail, which orbits or turns otherwise in a toothed ring, not shown in detail either. The supply of hydraulic fluid to the measuring motor happens as known per se via a channel arrangement, which is formed by a plurality of axially extending channels 13, which are distributed evenly in the circumferential direction, each being allocated to a gearwheel pocket between gearwheel and toothed ring. The gearwheel then rotates in accordance with the supplied amount of hydraulic fluid, and makes the outer control slide 6 follow the inner control slide 7 until the neutral position has again been reached, and the individual flow paths have been interrupted. For this purpose, the gearwheel is connected with the outer control slide 6.

Both the housing 4 of the control section 2 and the measuring motor 10, or the complete measuring motor section 3, respectively, can be made of traditional components. Modifications in relation to traditional steering units, which are only activated by a steering handwheel or a steering handwheel shaft, are not required.

An intermediary plate 14 is arranged between the control section 2 and the measuring motor section 3. The outer control slide 6 and the inner control slide 7 extend into the intermediary plate 14. The extensions form working slides 15, 16. As shown, they can be made in one piece with the outer slide 6 or the inner slide 7, respectively.

Between the working slides 15, 16 there is an annular slot 17, which is interrupted alternatingly by projections extending radially inwards from the working slide 15 and radially outwards from the working slide 16. Between the individual projections pressure chambers are formed, the pressure chambers belonging alternatingly to a first group and to a second group. For example, the arrangement can be made as shown in DE 195 46 281 A1, When the pressure chambers of one group are supplied with hydraulic fluid, their volume increases, and the two working slides 15, 16 are turned in one direction relative to each other. When the pressure chambers of the other group are acted upon by pressure, the relative turning will take place in the other direction.

For the supply of the pressure chambers in the annular slot 17, two fluid channels 18, 19 are arranged in the intermediary plate. The fluid channel 19 is shown with dotted lines, as in the circumferential direction it is placed in another position than the fluid channel 18.

The fluid channel 18 ends in the inner circumference of the intermediary plate 14 in a position, in which the outer circumference of the outer working slide 15 carries an annular groove 20. In a similar way the fluid channel 19 ends in the inner circumference of the intermediary plate 14 in a position, in which the outer circumference of the outer working slide 15 carries an annular groove 21.

As can be seen from FIG. 6, the annular groove 20 is connected with the annular slot 17 through several bores 22. The annular groove 21 is also connected with the annular slot 17 by means of several bores 23, however in an axially offset position. From FIG. 7, which schematically shows a section through the outer control slide 6 and the outer working slide 15, respectively, it can be seen that the bores 22 end between a projection 24 on the outer working slide 15 and a projection 25 (FIG. 8) on the inner working slide 16, the arrangement for the bores 23 being exactly vice versa.

The other end of the fluid channel 18 ends radially farther out in a bore 26, through which a fixing bolt 27 is led, which axially connects the control section 2 and the measuring motor section 3 by way of the intermediary plate 14. In the area of the bore 26, the fixing bolt has a reduced diameter, so that here an annular slot 28 appears. Via a radial bore 29 in the bolt, the annular slot 28 is connected with an axial bore 30 in the bolt. In the bolt head 31 a fluid connection 32 is provided, through which fluid from the outside can reach the groove 20 via the axial bore 30, the radial bore or bores 29, the annular slot 28 and the fluid channel 18. From there, the hydraulic fluid or pressure fluid is fed to the pressure chambers of one group. In a similar way, the pressure chambers of the second group are in connection with the surroundings via the fluid channel 19, which is connected in a bore 26 arranged in a different position in the circumferential direction, so that fluid, which is displaced from the pressure chambers of the second group on a volume increase of the pressure chambers of the first group, can flow off. When the relative turning of the two slides 6, 7 must take place in the other direction, the pressure fluid is supplied via the fluid channel 19.

Of course the individual parts control section 2, intermediary plate 14 and measuring motor section 3 are sealed to the required degree towards each other in the axial direction.

FIG. 2 shows a modified embodiment. The same parts carry the same reference numbers. Corresponding parts are provided with marked reference numbers. In this embodiment a large share of the length of the fixing bolt 27' has a reduced diameter, so that the annular slot 28' has a correspondingly larger axial length. The radial bores 29' of the fixing bolt 27' are thus no longer in the area of the intermediary plate 14', but in the area of the outer front plate 12 of the measuring motor section 3. Accordingly, the axial bore 30' can be somewhat shorter. It only has to extend onto the radial bores 29'. Otherwise, this embodiment corresponds to that of FIG. 1.

Further, it may be ensured in the intermediary plate that the two fluid channels 18', 19' end in the belonging bore 26 in the same axial position. This gives an even better correspondence in the flow resistances of the individual paths to the pressure chambers of the two groups. In this case it would also be possible to use a fixing bolt 27, 27', which forms only a very short annular slot 28, 28' in the bore 26. The fixing bolts for both pressure chamber groups can then be equally designed.

The FIGS. 3 and 4 show cross sections through a further embodiment of the intermediary plate 14", which substantially corresponds to the intermediary plate 14 in FIG. 1. The annular grooves 20', 21', however, are not arranged on the outside of the outer working slide 15, but on the inner circumference of the intermediary plate 14". Of course, an embodiment can also be chosen so that corresponding grooves 20, 20' and 21, 21', respectively, are arranged both on the outer circumference of the working slide 15 and on the inner circumference of the intermediary plate 14". In the embodiment in FIGS. 3 and 4, the bores 26, with which the fluid channels 18, 19 are connected, appear in the bottom. This is to make clear that the exact positioning of this bore in relation to the circumferential positioning is not particularly essential. Additionally, the sections of FIGS. 3 and 4 are offset (by 360/7)° in relation to each other, so that they also show different bores 26, 26".

FIG. 5 shows a further embodiment, in which the fluid channels 18" and 19" pass radially through the total intermediary plate 14'''. In this connection the fluid channels 18', 19' are arranged so that they run between, on the one side bores 26, serving the purpose of adopting the fixing bolts 27, and on the other side bores 33, which connect the control slide arrangement 6, 7 with the measuring motor 10.

The fluid channels 18', 19' end on the outside of the intermediary plate 14'''. For this purpose, the outside has an attachment with a plane surface 34, so that here, as can be seen from FIGS. 9 and 10, valves 35, 36 can be fixed, which can be operated via electrical connections 37, 38.

As can also be seen from the FIGS. 6 to 8, the axial sealing of the individual pressure chambers is made by walls 39 on the outer control slide 6 and walls 40 on the inner control slide or on the corresponding working slides 15, 16, respectively, so that the pressure chambers are exclusively formed by the two working slides 15, 16.

When the two fluid channels 18, 19 are connected to tank, for example by means of the valves 35, 36 or other control arrangements, the set of slides comprising the outer slide 6 and the inner slide 7 are reset to the neutral position by the spring package 9. When the pressure in one of the two fluid channels 18, 19 increases, whereas the other fluid channel is or remains in connection with a pressure sink via the corresponding outward connection, the pressure in the group of pressure chambers belonging to the first fluid channel 18 also increases. When the pressure is high enough, the torque between the inner and the outer control slide 15, 16 will be larger than the force of the spring package 9. Accordingly, the inner and the outer slide 7, 6 perform a relative turning.

As there is a unique correlation between the activating pressure and the resulting torque, the steering angle between the inner control slide 7 and the outer control slide 6 can be determined in that the pressure is selected in a certain relation to the counter-torque of the spring package 9.

When the steering arrangement is made as an LS-unit, that is, always feeds back the higher pressure ruling in the system to the pressure source, which is then opened accordingly, then a predetermined relative angle between the two control slides 6, 7 will correspond to a preset speed of the steering, as the surface characteristic of the working slides 15, 16, that is, the tooth size, and the preload pressure are known. It is then possible to steer with a desired speed, when one of the two fluid channels 18, 19 is acted upon by the correct pressure.

In practice it has turned out that a certain friction between the slides 6, 7 on the one hand and between the outer slide 6 and the housing 4 on the other hand cannot be avoided, which again causes that a somewhat higher pressure is required to obtain the desired steering.

To remedy this problem, a closed control can be provided, in which the angle speed of the steering column, which is for example measured by means of a steering handwheel sensor, is decisive for the pressure level in the annular slot 17 of the working slides 15, 16.

What is claimed is:

1. Hydraulic steering arrangement with a housing having an inner control slide and an outer control slide arranged to be mutually rotational, the control slides forming together a variable flow path device between a supply connection device and a working connection device, at least one pressure chamber located between two working slides, the working slides being connected to the control slides, volume change of said pressure chamber causing relative displacement between the working slides, a measuring motor, and an intermediary plate located between the measuring motor and the control slides, said plate having at least one fluid channel forming at least one part of a connection from the pressure chamber to outside.

2. Hydraulic steering arrangement according to claim 1, in which the working slides project into the intermediary plate.

3. Hydraulic steering arrangement according to claim 2, in which the fluid channel ends in an annular chamber which is formed between the intermediary plate and an outer one of the working slides.

4. Hydraulic steering arrangement according to claim 3, in which the annular chamber is formed by a groove in at least one of the outer circumference of the outer working slide and the inner circumference of the intermediary plate.

5. Hydraulic steering arrangement according to claim 1, including two fluid channels, each channel being connected with a group of pressure chambers, the two groups of pressure chambers having opposite action directions.

6. Hydraulic steering arrangement according to claim 5, in which connections between the two groups and the outside have substantially the same flow resistance.

7. Hydraulic steering arrangement according to claim 1, in which the fluid channel ends on an outer circumference of the intermediary plate.

8. Hydraulic steering arrangement according to claim 7, in which the intermediary plate has a plane bearing surface in an area in which the fluid channel ends outside.

9. Hydraulic steering arrangement according to claim 1, in which the fluid channel ends in a bore in the intermediary plate, a fixing bolt extending through the bore, the fixing bolt having a longitudinal bore which forms an additional part of the connection.

10. Hydraulic steering arrangement according to claim 9, in which the fixing bolt, for part of its length, is surrounded by an annular slot, the fixing bolt having at least one radial bore connected with the longitudinal bore and the fluid channel.

* * * * *